United States Patent

[11] 3,601,927

[72] Inventor Makoto Kikuchi
 Asahimachi, Japan
[21] Appl. No. 871,824
[22] Filed Oct. 28, 1969
[45] Patented Aug. 31, 1971
[73] Assignee Toyoda Koki Kabushiki Kaisha
 Asahimachi, Kariya, Japan
[32] Priority Oct. 29, 1968, Dec. 5, 1968
[33] Japan
[31] 43/79015 and 43/88810

[54] AUTOMATIC LOADING AND UNLOADING DEVICE FOR A GRINDING MACHINE
11 Claims, 10 Drawing Figs.
[52] U.S. Cl. .................................................... 51/215 R,
 51/103 WH
[51] Int. Cl. .................................................... B24b 47/02
[50] Field of Search ........................................... 51/215,
 215.4, 215.3, 103 WH

[56] References Cited
UNITED STATES PATENTS
2,912,798 11/1959 Seidel et al. .................. 51/103
3,226,886 1/1966 Seidel .......................... 51/215

Primary Examiner—William R. Armstrong
Attorney—Hutchinson and Milans

ABSTRACT: In a double arm-type automatic loading and unloading device for loading and unloading workpieces in a grinding machine, wherein an unfinished workpiece is brought up to the grinding position by a loading arm and a finished workpiece is moved out of the grinding position by an unloading arm, the improvement wherein the device employs an unloading arm embodying two rodlike members pivotally connected to each other and being able to be shortened or extended so that the workpiece to be carried into grinding position by the loading arm and the workpiece to be carried out of that position by the unloading arm do not clash or interfere with each other during operation of the device.

INVENTOR:

MAKOTO KIKUCHI

Attorneys

INVENTOR:

MAKOTO KIKUCHI

INVENTOR:

MAKOTO KIKUCHI

AUTOMATIC LOADING AND UNLOADING DEVICE FOR A GRINDING MACHINE

DESCRIPTION OF THE INVENTION

A primary object of the invention is to provide an automatic loading and unloading device for a grinding machine which comprises a loading arm and an unloading arm, the unloading arm including two rod members pivotally connected with each other so that one of them is turnable relative to the other of them during unloading operation to avoid clash between a workpiece on the loading arm and a workpiece on the unloading arm.

Another object of the invention is to provide an automatic loading and unloading device for a grinding machine, wherein the time required for loading and unloading workpieces is shortened by minimizing moving distances of the loading arm and the unloading arm.

Still another object of the invention is to provide an automatic loading and unloading device for a grinding machine which increases the overall efficiency of the resultant grinding operation.

A further object of the invention is to provide an automatic loading and unloading device for a grinding machine which is provided with sequentially operated actuators for controlling the movements of the loading arm and the unloading arm, respectively, to carry workpieces to and out of grinding position, and the actions of these arms in engaging and disengaging the workpieces.

These and other objects of this invention will become more fully apparent from the following detailed description of several preferred embodiments of the invention, reference being made to the accompanying drawings, in which.

Figure 1:
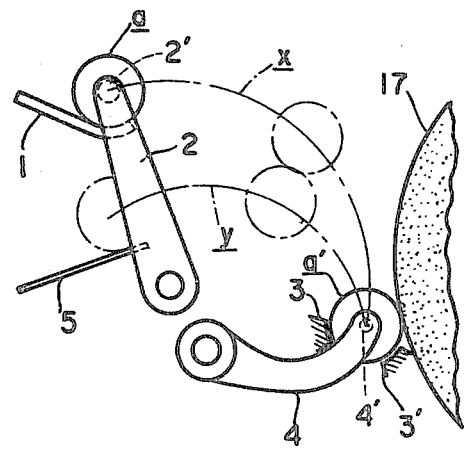
FIG. 1 is a schematic disclosure in side elevation explaining the actions of the conventional loading arm and unloading arm in a grinding machine of the prior art.

In FIG. 1 there is illustrated a loading arm and an unloading arm in a conventional automatic device for loading and unloading workpieces in a grinding machine. In such a prior art device, a workpiece of cylindrical shape, or of annular shape, in the preferred embodiment, is placed on an inclined feed channel 1. A support pin 2' projecting from the side surface at the end of the loading arm 2 is engaged with a center hole in the end of the workpiece a. Thus, the workpiece a is supported and carried by the support pin 2' at the outer end of the loading arm 2. The loading arm 2 is rotated in a clockwise direction through a drive shaft located at the lower end thereof, thereby carrying the workpiece a, supported thereon by the pin 2', from the feed channel 1 along the arc route x onto the work supports 3,3'.

After the workpiece a has been positioned on the supports 3, 3', the loading arm 2 is displaced in a perpendicular direction with respect to the plane of FIG. 1 to thereby remove and disengage the pin 2' from the center hole of the workpiece a, after which the arm 2 is returned by being rotated in a counterclockwise direction. Thus, arm 2 returns to the original loading position. (The position of the loading arm 2 shown in FIG. 1 is referred to as the "loading position" hereinafter.)

The workpiece a placed on the supports 3, 3' is held by a magnetic chuck (not shown) at its sides and rotated to be machined on the periphery thereof by a grinding wheel 17.

When the grinding operation on the workpiece a is finished, the support pin 4' projecting from the side surface near the outer end of the unloading arm 4 is engaged with the center hole of the workpiece a when the unloading arm 4 is moved in a perpendicular direction with respect to the plane of FIG. 1 toward the end of the workpiece. (The perpendicular direction with respect to the plane of FIG. 1 will be referred to as "perpendicular direction.") Then the arm 4 is turned counterclockwise, thereby carrying the finished workpiece a' engaged with the pin 4' from the work supports 3,3' following the arc route y to place the workpiece on a discharge channel 5. Thereafter, the arm 4 is displaced in a perpendicular direction to disengage the support pin 4' from the center hole of the workpiece a' and leave the finished work a' on the discharge channel 5.

Thereupon, the unloading arm 4 is turned clockwise around its own lower end, so that the support pin 4', without now supporting the workpiece a', follows the return arc route y. Thus the arm 4 reverts to the machining or grinding position as shown in FIG. 1.

In this manner, the unfinished workpiece a is carried onto the work supports 3, 3', while the finished workpiece a' is removed from the work supports 3, 3'. It is necessary to so arrange the parts that the periphery of the finished workpiece a' held on the supports 3, 3', when being moved out of the grinding position, may not strike or hit the top fringe or edge of the work support 3. For this purpose, the route of the support pin 4' of the unloading arm 4 has to follow, as indicated by y, an arc which runs as vertically as possible when the support pin 4' moves in the vicinity of the work support 2.

Meanwhile, the loading arm 2 and the unloading arm 4 have to be simultaneously moved in opposite directions by a rack-and-pinion mechanism to carry out the above-mentioned loading and unloading operations so that the time required for feeding and withdrawing the workpieces may be shortened as much as possible.

Thus, the workpiece a and a' are required to pass through the arc routes x and y without clashing with each other. To avoid the clash between the finished workpiece a and the unfinished workpiece a', the drive axes of the loading and unloading arms have to be provided with a large distance therebetween and the arms themselves are also required to swing or turn within a large arc. Thus, in the conventional device of the prior art there is a drawback in that, with an increased diameter in the workpiece to be machined, the lengths of the loading arm and the unloading arm have to be increased, and as a result, the workpiece loading and unloading time will be increased to thus cause an increase in the overall machining time cycle with a resultant drop in the efficiency of the machining operation.

Figure 2:
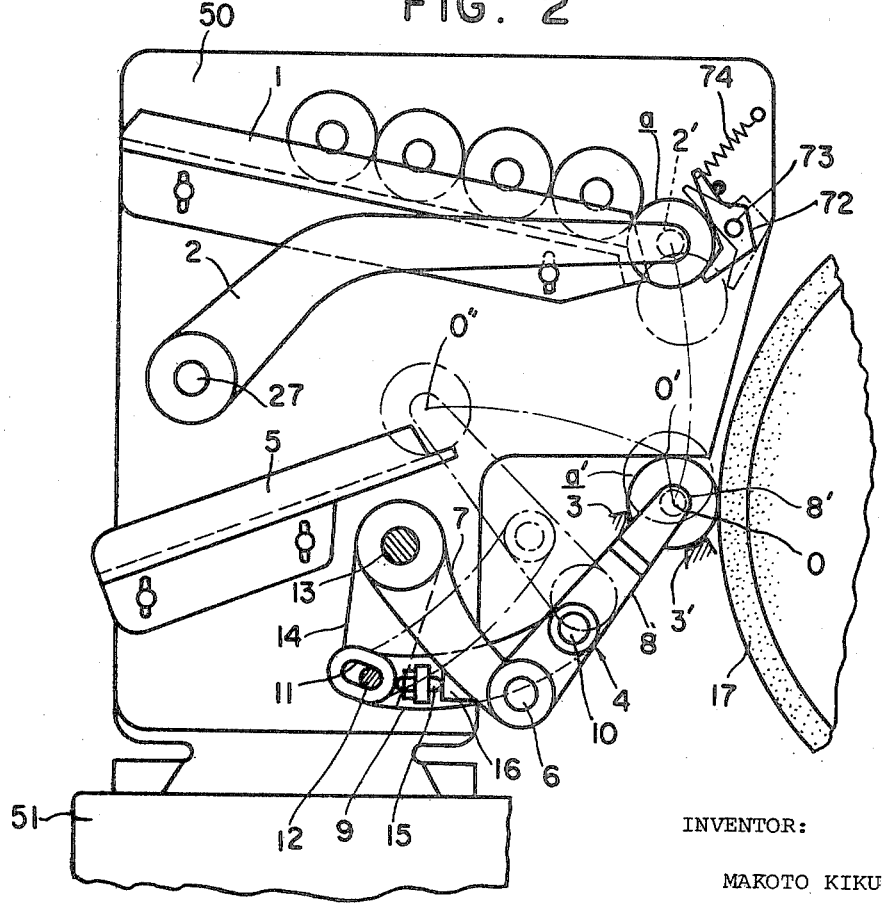
FIG. 2 is a side elevation view of one embodiment of this invention.

The present invention is free from these drawbacks. Referring to FIG. 2, illustrating a first embodiment of this invention, a feed channel 1 is installed on a plate 50 fixedly mounted on a base 51 of a machine tool and inclined as shown in this figure. This channel receives unfinished workpieces a to be ground, and under their own weight the workpieces a will move steadily toward the right by gravity down the inclined channel 1.

Spaced apart from the right end (FIG. 2) of the feed channel 1 is a stop hook 72 which is pivotally mounted on the plate 50 by means of a pivot pin 73. The top end of the hook 72 is under tension of a spring 74 and held in the position indicated by the solid line in FIG. 2 so that the workpiece a moving down toward the right end of the feed channel 1 will be prevented from dropping out of the end of the channel 1, being retained therein by the lower part of the stop hook 72, as shown.

The numeral 2 represents a loading arm, whose pin 2', projecting from the side surface of the outer end thereof, is engageable with the center hole of the workpiece $a$ held by the stop hook 72.

Beneath the loading arm 2 there is an unloading arm 4, which consists of a rod member 7 fixed to a swing shaft 13 and a rod member 8 is pivotally connected to the tip of the rod member 7 by a pivot pin 6. Of these two members 7, 8 which make a V-shape in collapsed state, the rod member 8 is equipped with a pin 8' to hold the workpiece $a$ and has a link 9 pivotally connected to its midpoint by a pivot pin 10. The link 9 lies across the member 7. A long slot 11 is provided at the other end of the link 9 and a pin 12 provided at the tip of a fixed arm 14 is engaged with the long slot 11 with a clearance.

At midpoint of the link 9 is fitted a stop bolt 15. A boss 16 is integrally formed on the member 7 so as to regulate relative movement among the members 7, 8 and 14 by engaging with the stop bolt 15.

The member 7 can be swung by the swing shaft 13. When the member 7 begins to turn counterclockwise around the swing shaft 13. The members 7, 8 and the link 9 also turn around the shaft 13. Thereby the long slot 11 of the link 9 shifts rightward relative to the pin 12, bringing the elements to the position shown in FIG. 3.

Figure 3:
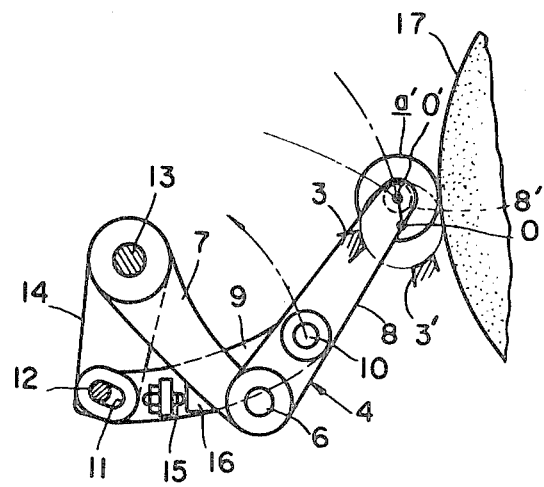
FIGS. 3 and 4 illustrate in side elevation the action or movement of the unloading arm according to this embodiment of the invention.

As the member 7 continues to turn around the shaft 13 further in a counterclockwise direction from the position of FIG. 3, the link 9 begins to turn counterclockwise around the pin 12.

Figure 4:
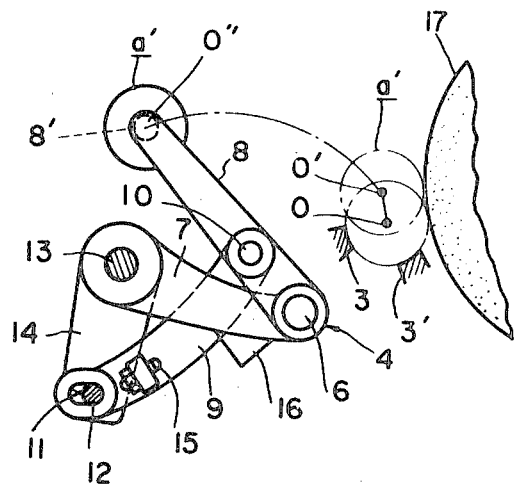

The pivot pin 6 now shifts in a counterclockwise direction around the shaft 13, while the pivot pin 10 also shifts in a counterclockwise direction around the pin 12. Thus, the support pin 8' on the member 8 quickly shifts leftward from the position 0' to an unloading position 0", as shown in FIG. 4, so that the rod member 8 is rotated counterclockwise around the pivot pin 10. In consequence, the motion in a vertical direction of the support pin 8' is quite small to thereby avoid the clash between the unfinished workpiece supported by the support pin 2' and the finished workpiece supported by the support pin 8'.

When the shaft 13 is rotated in clockwise direction after the members 7, 8 and the link 9 have returned to the unloading position O" (FIG. 4), the member 7 turns clockwise around the shaft 13, while the member 8 turns clockwise around the pivot pin 6 which shifts downward from the position of FIG. 4. Toward the end of the returning motion of the unloading arm 4, the boss 16 engages the stop bolt 15 on the link 9 and thereafter, the unloading arm 4 is further rotated clockwise by means of the swing shaft 13 until the pin 12 is engaged with the right end of the long slot 11 resulting in stopping of the returning motion. Through the engagement between the boss 16 and the stop bolt 15, the support pin 8' is located at the desired position, i.e. machining position 0.

Figure 7:
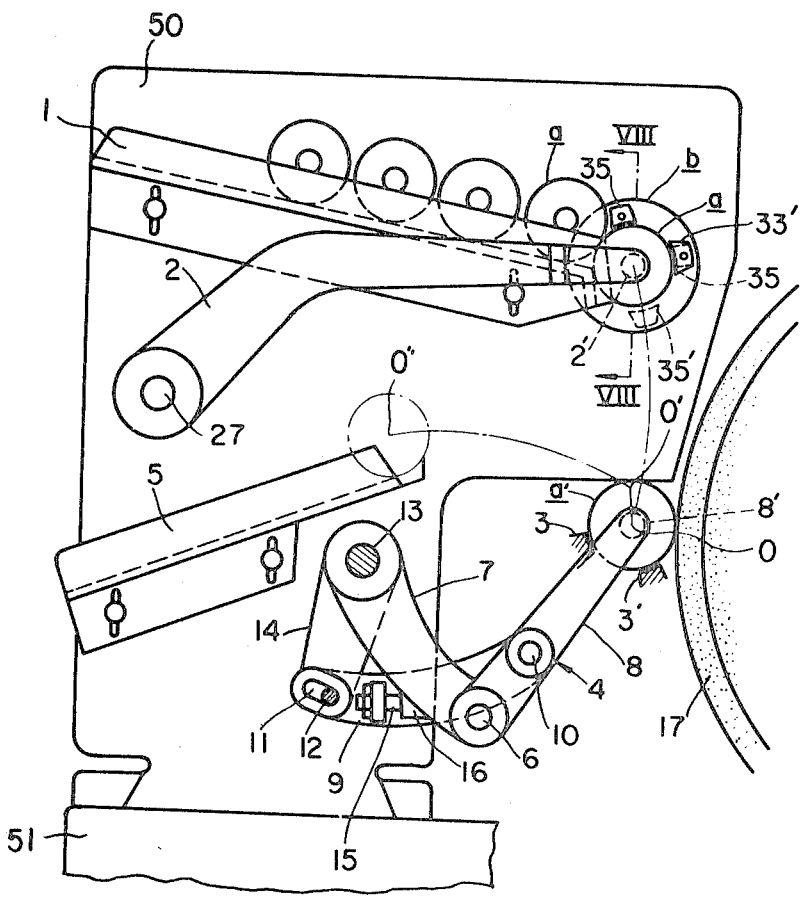
FIG. 7 is a side elevational view of another embodiment of this invention.
Figure 8:
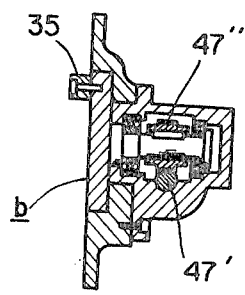
FIG. 8 is a sectional view of FIG. 7 taken along the line VIII—VIII.

FIG. 7 illustrates another embodiment of this invention. In this second embodiment there is provided a work divider $b$ instead of the stop hook 72 of the FIG. 2 embodiment, but otherwise the structure is identical with the embodiment shown in FIG. 2 in all other respects. Reference number 1 is an inclined feed channel supported by a plate 50 fixed to a base 51 of a machine tool. Upon this channel are placed the workpieces $a$ to be ground, which steadily move toward the right under their own weight. In the vicinity of the right end of the feed channel 1 is provided a rotatable divider $b$ for controlling the feed of the workpieces to be ground. Two hooks are provided on a surface of the rotary divider $b$ and engage the workpiece on the feed channel 1 to prevent the workpiece from dropping from the feed channel 1. When, as described later, the divider $b$ is rotated, the hooks 35, 35' are brought to a position where the loading arm 2 may carry the workpiece from the feed channel 1 to the grinding position. The unloading arm 4 located beneath the loading arm 2 consists of a rod 7 fixed to the swing shaft 13 and a rod 8 pivotally connected to the tip of the rod 7 by the pivot pin 6. The rod 8 is provided with a pin 8' for supporting the workpiece $a'$ by engaging with the center hole of the workpiece $a$. A link 9 lies across the rod 7 and is pivotally connected to the rod 8 at one end thereof and at the other end thereof is provided with a long slot 11. A pin 12 is provided at the tip of a fixed arm 14 and engages with the long slot 11 with adequate clearance.

A stop bolt 15 is provided on the link 9, while a boss 16 is integrally formed on the arm 7, so as to regulate the relative movement between the rod 7 and 14 by engaging with the stop bolt 15.

When the shaft 13 swings in clockwise direction after the members 7, 8 and the link 9 have returned to the unloading position 0" (FIG. 4), the member 7 turns clockwise around the shaft 13, while the member 8 turns clockwise around the pivot pin 6 which shifts downwardly from the position of FIG. 4. Toward the end of the returning motion of the unloading arm 4, the boss 16 is engaged with the stop bolt 15 on the link 9 and thereafter, the unloading arm 4 is further rotated clockwise by means of the swing shaft 13 until the pin 12 is engaged with the right end of the long slot 11 resulting in stopping of the returning motion. Through the engagement between the boss 16 and the stop bolt 15, the support pin 8' is now located at a desired position i.e., machining position 0.

Figure 5:
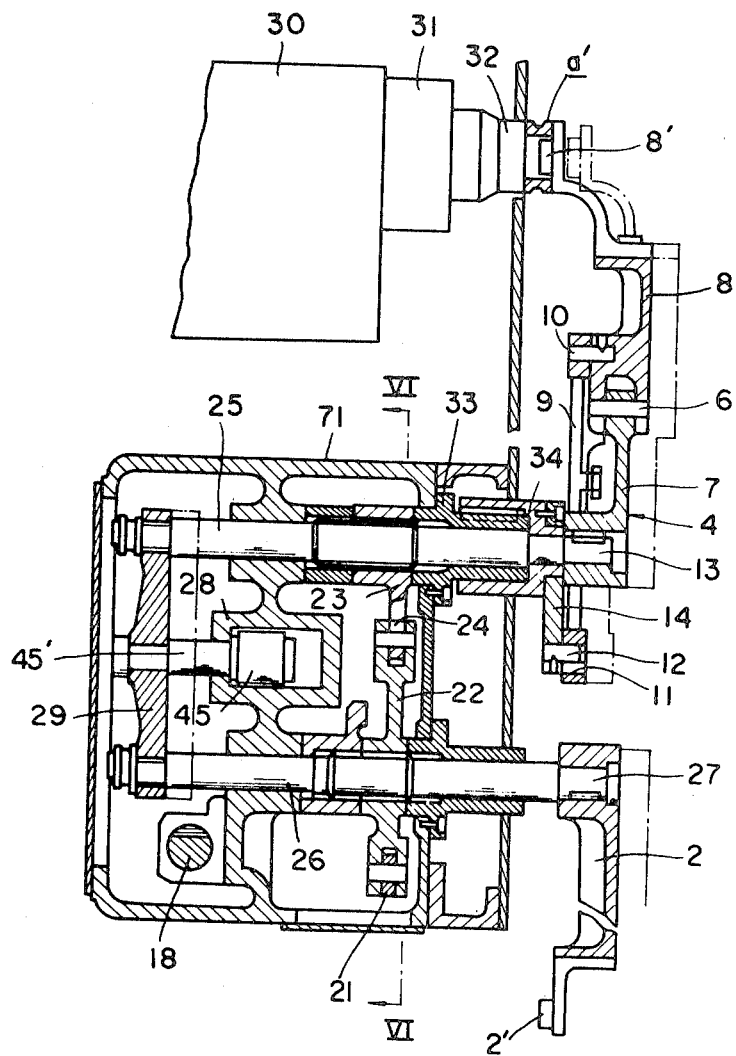
FIG. 5 is a fragmentary sectional view illustrating a drive mechanism for the loading and unloading devices according to this invention.
Figure 6:
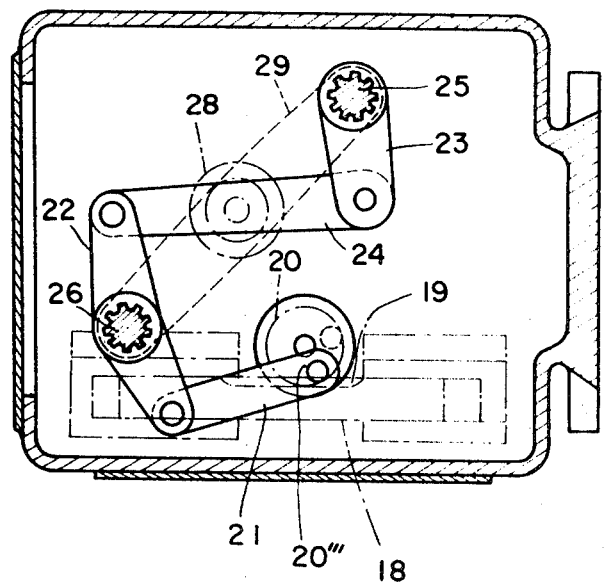
FIG. 6 is a sectional view taken along the line VI—VI of FIG. 5.

The loading arm 2 shown in FIGS. 2 and 7 is fixed, as indicated in FIG. 5, to a swing shaft 27 which is consolidated with a spline shaft 26. The spline shaft 26 is splined, as shown in FIGS. 5 and 6, with a swing rod 22. The spline shaft 26 swings together with the swing rod 22, but is slidable in an axial direction with respect thereto.

The swing shaft 13 to which the rod 7 of the unloading arm 4 is fixed is integrated with a spline shaft 25, as shown in FIG. 5, while the spline shaft 25 is splined with a swing rod 23, as shown in FIGS. 5 and 6. The spine shaft 25 turns together with the swing rod 23, but it is relatively slidable in an axial direction with respect to the swing rod 23.

The top of the swing rod 22 and the bottom of the swing rod 23 are pivotally connected to the opposite ends of a swing rod or link 24, the swing rod 24 assuring simultaneous rotational movement of the spline shafts 25, 26 in opposite directions.

Meanwhile, a reciprocating rack piston 18 is provided with a rack 19 thereon which meshes with a pinion 20. The pinion 20 is connected to one end of a connecting rod 21 by a pin 30''' with some eccentricity to thereby create a so-called crank mechanism. The other end of the connecting rod 21 is connected to the lower end of the swing rod 22.

When the rack piston 18 is moved axially by the force of pressure fluid, the pinion 20, meshing with the rack 19, is turned, causing the swing rod 22 to swing together with the spline shaft 26 through the connecting rod 21 eccentrically connected to the pinion 20. The swinging motion of the swing rod 22 is transmitted via the connecting rod 24 to the swing rod 23 to rotate the spline shaft 25. The rotary motion of the spline shaft 25 is transmitted to the rod 7 of the unloading arm 4 via the swing shaft 13 which is consolidated with the spline shaft 25. The rotary movement of spline shaft 26 causes the loading arm 2 to swing by virtue of the swing shaft 27 being integrated with the spline shaft 26. Therefore, the rotational movement of the rod 7 and that of the loading arm 2 are taking place simultaneously and in opposite directions.

As seen from FIG. 5, the left ends of the spline shafts 25, 26 are rotatably connected to opposite ends of a connecting rod 29 with the middle portion of the connecting rod 29 being coupled to a piston rod 45' of a hydraulic actuator 28 for axial shifting of the spline shafts 25, 26. When the piston 45 of the hydraulic actuator 28 is moved by pressure fluid, the connecting rod 29 is displaced to the left or right in FIG. 5, thereby moving the spline shafts 25, 26 in an axial direction. When the spline shafts 25, 26 are so moved in an axial direction, both the loading arm 2 and the unloading arm 4 are shifted between the positions indicated by the solid line and the position indicated by the chain line in FIG. 5, whereby the supporting pins 2' and 8' are engaged or disengaged with the center holes of the workpieces $a$ and $a'$ respectively.

A slidable sleeve 34 is mounted on the spline shaft 25 and is slidably engaged with a fixed sleeve 33 fixed to the housing 71. The sleeve 34 is retained from rotation with respect to the spline shaft 25 by means of a key inserted between the sleeve 33 and 34, however the sleeve 34 is movable in an axial direction together with the spline shaft 25. Therefore, the fixed arm 14, which is fixed to the slidable sleeve 34 and sandwiched between the slidable sleeve 34 and the rod 7, is shiftable in an axial direction with respect to the spline shaft 25 together with the rods 8 and 9 to thereby maintain the proper relationship between the rods 8, 9 and 14.

In FIG. 5, 30 is a headstock, 31 is a magnetic chuck, and 32 is a pole piece.

Figure 9:
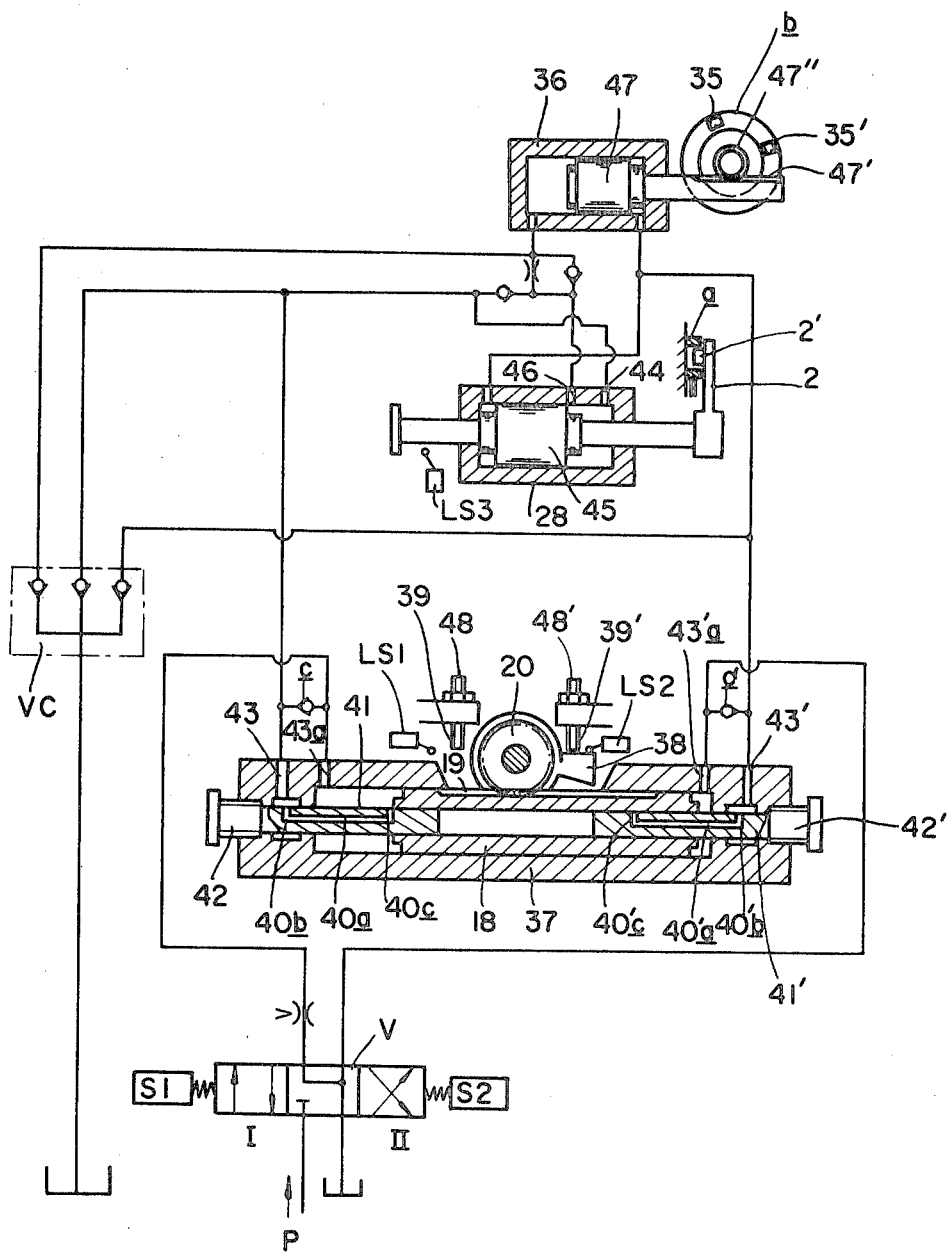
FIG. 9 is a schematic showing of a hydraulic circuit for a drive mechanism for the embodiment of this invention shown in FIG. 7.

FIG. 9 shows a pressure fluid circuit applied to the embodiment shown in FIG. 7. The rack piston 18 is slidably mounted in a cylinder 37 closed at both ends and said piston is provided with a through hole therein. On the top surface of the rack piston 18 is installed a rack 19, which meshes with the pinion 20.

The shaft of the pinion 20 is provided with a projection 38, which swings together with the pinion 20, thereby hitting right and left stops 39, 39' and limiting the rotational range of the pinion 20, i.e., the stroke of the rack piston 18.

Valve rods 41, 41' are slidably inserted into the through hole or internal bore of the rack piston 18 from the opposite ends thereof. The valve rods 41, 41' are fitted with screws 42, 42' at the opposite ends of the cylinder 37, and the extension into the cylinder 37 of these rods can be varied by turning the screws. In the valve rods 41, 41' are provided communication holes 40b, 40c and 40'b, 40'c, respectively. These holes 40b, 40c and 40'b, 40'c are connected, respectively, by communication passages 40a and 40'a.

In the cylinder 37 there are provided circulation orifices 43, 43a, 43', 43a' respectively communicating with the holes 40b and 40b', and a right chamber of the cylinder 37, a left chamber of the cylinder 37 and the pressure fluid circulates through these circulation holes and passages as hereinafter explained. Meanwhile, there are inserted check valves c, c' respectively between the conduits leading to circulation holes 43, 43a and between the conduits leading to 43', 43'a, the check valves c, c' permitting only flow of fluid from 43, 43' into 43a, 43a', respectively.

In FIG. 9, $LS_1$, $LS_2$ are limit switches for confirming respectively the fact that the loading arm 2 arrives at the loading position and the grinding position. $LS_3$ is a limit switch for confirming the fact that the support pins are disengaged from the center holes of the workpieces. Vc are check valves for individual operation, i.e., a suction valve for making separate, manual operation of the pistons 18, 45 and 47 with deenergization of solenoids $S_1$, $S_2$ (FIG. 9).

When the solenoid $S_1$ is energized a changeover valve V is changed from neutral position to left position I whereby the pressure fluid from the supply source P is supplied into the cylinder 37 through a conduit leading to the circulation hole 43a, resulting in the rightward motion of the rack piston 18. Upon rightward shift of the rack piston 18 to the position indicated in FIG. 9, the pressure fluid which has been supplied to the left side of the rack piston 18 will now flow via the passageways and holes 40c, 40a, 40b of the valve rod 41 and via the circulation hole 43 on the left, out of the cylinder 37 and through a passageway leading into a right hole 44 of the hydraulic actuator 28, to thereby move the piston 45 to the left. When the piston 45 has been shifted to the left end position, as shown in FIG. 9, an orifice 46 is uncovered and pressure fluid flows through a passageway into the left side of the hydraulic actuator 36 for turning the rotary divider b.

Together with the displacement of the piston 45 of the arm shaft shift actuator 28, the connecting rod 29 shown in FIG. 5 moves to shift the spline shafts 25, 26 in an axial direction. This results in both the loading arm 2 and the unloading arm 4 moving together with the spline shafts 25, 26 and as a result the pins 2', 8' on the side surfaces of their ends are engaged with the center holes of the workpieces a, a'.

A rack is provided on the top surface of the exposed portion of the piston rod 47' of the piston 47 in the hydraulic actuator 36, the rack meshing with a pinion 47'' provided on the work divider b, so that with displacement of the piston 47 the work divider b may swing around to change the positions of the work supply hooks 35, 35' for controlling the release of the workpieces from the feed channel 1.

In FIG. 7, the support pin 2' projecting on the tip side surface of the loading arm 2 is in the center hole of the workpiece a located at the terminal of the feed channel 1, while the support pin 8' projecting on the tip side surface of the rod member 8 of the unloading arm 4 is also in the center hole of the workpiece a' located on the work supports 3, 3'. These are the original positions or start positions of the loading arm 2 and the unloading arm 4 for loading and unloading workpieces from the machine tool. At this time and under these conditions, as seen from FIG. 9, the rack piston 18 and the piston 47 are at the right of their respective cylinders, while the piston 45 is at the left-hand position of cylinder 28.

When in this initial state, the workpiece a' on the supports 3, 3' is ground by the grinding wheel 17 and thereafter the wheel slide carrying the grinding wheel 17 is retracted. Upon confirmation of the wheel slide retraction, the solenoid $S_2$ is energized and the changeover valve V is shifted from the neutral position of FIG. 9 to the right-hand position II whereby the pressure fluid from the supply source P is supplied through a conduit leading to the circulation hole 43'a into the right side of the cylinder 37 and accordingly the rack piston 18 begins to move to the left. At the same time as the start of the leftward movement of the rack piston 18, the pinion 20 which meshes with the rack 19 on the top of the piston begins to rotate clockwise. As the pinion 20 begins to rotate clockwise, the spline shaft 26 begins to swing clockwise via the connecting rod 21 and the swing rod 22 (FIG. 6) and in consequence the loading arm 2, with its projection 2' at its tip side holding the workpiece a, begins to go down or rotate clockwise.

Meanwhile, through movement of the swing rod 22, the link rod 24 and the swing rod 23, the spline shaft 25 begins to swing counterclockwise and in consequence the rod member 7 of the unloading arm 4 begins to turn counterclockwise.

As the rod member 7 begins to turn counterclockwise from the grinding position at first the rod members 7, 8 and the link 9 swing together by the length of the long slot 11 of the link 9 around the swing shaft 13, thereby permitting the workpiece a' to go from the grinding position 0 to the point 0' in FIG. 3 fully clearing and without hindering the work supports 3, 3'. When the workpiece a' reaches the point O' as indicated by a solid line in FIG. 3, the pin 12 projecting at the lower end of the fixed arm 14 engages the left side of the long slot 11.

When the shaft 13 turns or swings in clockwise direction after the members 7, 8 and the link 9 have returned to the unloading position 0'' (FIG. 4), the member 7 turns clockwise around the shaft 13, while the member 8 turns clockwise around the pivot pin 6 which shifts downward from the position of FIG. 4. Toward the end of this returning motion of the unloading arm 4, the boss 16 is engaged with the stop bolt 15 of the link 9 and thereafter, the unloading arm 4 is further rotated clockwise by means of the swing shaft 13 until the pin 12 is engaged with the right side of the long slot 11 resulting in stopping of the returning motion. Through the engagement between the boss 16 and the stop bolt 15, the support pin 8' is located at a desired position, i.e. machining position 0.

When the rack piston 18 reaches the end of its sliding movement, where it is restricted by the stop 39 (FIG. 9), the loading arm 2 holding the unfinished workpiece a moves up to the machining position, where the workpiece a is placed on the work supports 3, 3' and fitted to the headstock 30 by means of the magnetic chuck 31 shown in FIG. 5, while at the same time the unloading arm 4 holding the finished workpiece a' moves to the discharge channel 5. When said rack piston 18 reaches the left end of its sliding movement the limit switch $LS_1$ is actuated to generate a signal to move the wheel slide toward the workpiece a to begin the grinding operation on the workpiece a with the grinding wheel 17.

Meanwhile, when the rack piston 18 reaches the left end of its sliding movement the communication hole 40'c is uncovered and opens into the right-hand chamber of the cylinder 37, and thus, the circulation hole 43'a is connected to the circulation hole 43' through the communication passage and holes 40'b, 40'a, 40'c.

With mutual communication of the two circulation holes 43', 43'a, the pressure fluid from the supply source P begins to flow into the left side of the arm shaft shift actuator 28 and into the right side of the swing actuator 36, thereby beginning to move the piston 45 to the right and the piston 47 to the left.

As the piston 45 begins to move rightward, the connecting rod 29 (FIG. 5) is moved to the right, thereby causing the spline shafts 25, 26 to slide in an axial direction; the loading arm 2 and the unloading arm 4 to move to the right; the pins 2', 8' on their tip sides to be disengaged from the workpieces a, a'; and the finished work a' to be released from the unloading channel 5. The workpiece a still being machined is attracted and held by the magnetic chuck 31 and continues to be machined.

When at the same time the piston 47 of the swing actuator 36 is displaced leftward as described above, the pinion 47'' which meshes with the rack of the piston rod 47' turns clockwise, thereby causing the work divider b to turn clockwise; the work supply hooks 35, 35' to move from the position indicated by solid line in FIG. 7 to the position indicated by dotted lines and the next fresh workpiece a moved down to locate at the position where the preceding workpiece was located.

Since the stops 39, 39' are formed with threads 48, 48', they can be turned to adjust the stop position of the projection 38. Meanwhile, the valve rod 41', which is attached to the end face of the cylinder 37 by the screw 42', can be axially adjusted and moved by turning. Thus, the time when the circulation holes 43', 43'a are connected to each other through the communication passage and holes 40'c, 40'b, 40'a, due to leftward shift of the rack piston 18, can be changed.

When the piston 45 reaches the right end of its sliding movement the limit switch LS₃ is pushed or actuated to generate a signal for deenergizing the solenoid S₂ and energizing the solenoid S₁. This results in the changeover valve V moving from the right position II to the left position causing the pressure source P to communicate with the circulation hole 43a, and the rack piston 18 located at the left end of the cylinder 37 now begins to move to the right and the pinion 20 meshing with the rack 19 on the piston begins to turn counterclockwise.

When the pinion 20 begins to turn counterclockwise, the spline shaft 26, through the connecting rod 21 and the swing rod 22 in FIG. 6, begins to turn counterclockwise and thus, the loading arm 2, which has delivered the workpiece a to the machining position, begins to swing up from the machining position toward the loading position adjacent to the right of the feed channel 1.

Meanwhile, the spline shaft 25, through the swing rod 22, the link rod 24 and the swing rod 23, begins to turn clockwise and the rod member 7 of the unloading arm 4, which has carried the finished workpiece a' to the discharge channel 5, begins to turn clockwise from the discharge position to the machining position.

When the rod member 7 begins to turn clockwise around the swing shaft 13 from the position shown in FIG. 4, the link 9, with the right side of its long slot 11 in contact with the pin 12 and the rod member 8, turns clockwise, following about the same route as in the opposite direction.

In midturning, the boss 16 integrally formed on the rod member 7 contacts the tip of the stopper bolt 15 provided on the link 9. The link 9 is pushed by the boss 16 to move along the pin 12 provided on the fixed arm 14. Thus the rod members 7, 8 and the link 9 as a single unit swing together clockwise around the swing shaft 13.

When the rack piston 18 reaches the sliding end and the projection 38 hits the stop 39', the communication hole 40c is uncovered and opens into the left chamber of the cylinder 37, making the two circulation holes 43, 43a communicate with each other through the communication passage and holes 40b, 40a, 40c.

When the two circulation holes 43, 43a are in communication with each other, the pressure fluid from the supply source P flows into the right side of the arm shaft shift actuator 28 to displace the piston 45 to the left.

This leftward displacement of the piston 45 causes the pin 2' projecting on the tip side of the arm 2 to engage the center hole of the work a supported on the work supply hooks 35, 35' and the pin 8' projecting on the rod member 8 of the arm 4 to engage the center hole of the finished work a' on the work supports 3, 3'.

When the piston 45 moves to the left and as the result the pins 2', 8' are engaged with the workpieces a, a', the intermediate hole 46 of the arm shaft shift actuator 28 opens and through this hole 46 the pressure fluid sent to the arm shaft shift actuator 28 is introduced into the left side of the swing actuator 36, thereby moving the piston 47 to the right.

When the piston 47 moves to the right, the pinion 47'' meshing with the rack of the piston rod 47' turns counterclockwise together with the work divider b and the work supply hooks 35, 35' assume the position indicated by a solid line in FIG. 7, that is, the condition where the workpiece a can be taken away from the feed channel 1 by the loading arm 2.

This is the initial state mentioned at first in the description of action and this state is maintained until the machining operation on the workpiece a supported by the work supports 3, 3' is finished.

When the machining is completed and the withdrawal of the wheel slide is confirmed, an instruction is issued to deenergize the solenoid S₁, while the solenoid S₂ is energized to cause the rotation of the loading arm 2 and the unloading arm 4, repeating the same process as before.

In this manner, both the loading arm 2 and the unloading arm 4 are returned to the original position while the workpiece a is being machined. These arms are kept at rest until the machining operation on the workpiece a is completed. Therefore, the net time required for loading and unloading is almost equal to the time needed for the loading arm 2 to carry the unfinished workpiece a from the loading position to the machining position. The cycle time of grinding operation according to the invention is resultantly shortened by a shortened time required for loading and unloading workpieces, since the swing strokes of the loading and unloading arms are quite short so that the clash between the finished and unfinished workpieces is effectively avoided by lifting from the work supports 3, 3' for a short distance, i.e. point 0 to 0' and thereafter, moving it in an almost leftward direction from the point 0' to 0''.

As described above, the time when the piston 45 begins to move can be freely selected by adjusting the valve rods 41, 41'. Accordingly, the supply of pressure fluid to the actuator 28 can be timed with the sliding of the rack piston 18 (near the sliding end); and the adjustment in the assembly is very easy.

Figure 10:
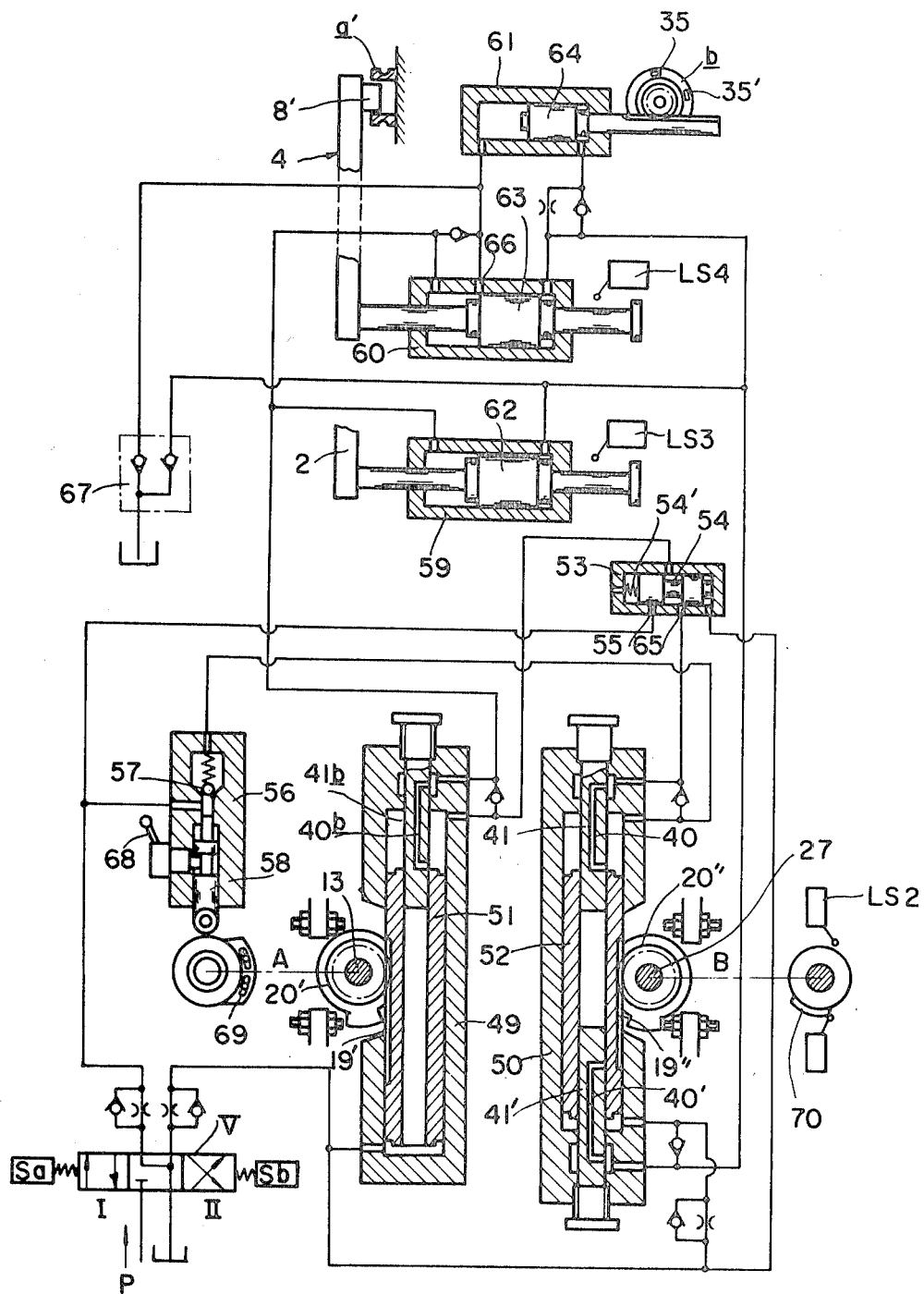
FIG. 10 is a schematic showing of another hydraulic circuit for a drive mechanism applied to another embodiment of this invention.

FIG. 10 illustrates another embodiment of a hydraulic circuit according to this invention, which is particularly convenient for machining large diameter workpieces.

In this embodiment the loading arm 2 and the unloading arm 4 are not simultaneously moved, but are alternatively moved by means of two sequence action cylinders and a mechanical changeover valve, to avoid any interference between the finished and unfinished workpieces. Namely, separate hydraulic actuators are provided to move the loading arm 2 and the unloading arm 4.

The difference in the embodiment in FIG. 10 from the preceding embodiment is that the timing of loading is delayed after that of unloading, so that the workpieces may not clash with each other.

For this purpose a sequential action is assured by the actuator with separately adjustable strokes. Thus with a wide range of applications, from simultaneous loading and unloading of relatively small diameter workpieces to sequential loading and unloading of large diameter workpieces to be loaded and unloaded one after another, this embodiment eliminates waste of time depending on the diameter of workpiece and reduces the cycle time of the operation.

The loading arm and the unloading arm in the embodiment illustrated in FIG. 10 are the same as those illustrated in FIGS. 3, 4 and 7.

In FIG. 10, reference numeral 49 is an operating actuator for the unloading arm 4. With upward movement of piston 51 the unloading arm 4 turns in a counterclockwise direction in FIG. 7 and with downward movement of piston 51 it turns in a clockwise direction. Meanwhile, a cam 69 fitted on the swing shaft 13 of the unloading arm 4 turns together with it.

Reference numeral 50 is an operating actuator for the loading arm 2. When the piston 52 is moved in an upward direction, the loading arm 2 moves clockwise in FIG. 7. When the piston 52 is moved in a downward direction, the arm moves counterclockwise. A dog 70 is provided on the swing shaft 27 of the loading arm 2 so that it is rotated therewith.

Reference numeral 56 is a mechanical changeover valve which is provided with a check valve 57 therein. When a spool 58 is moved upward by engagement with the cam 69, the check valve 57 is opened against the force of a spring means by the plunger of the spool 58. Reference numeral 68 is a manual switch lever which serves to hold the spool 58 in raised position regardless of the position of the cam 69 to keep the check valve 57 open.

Reference numeral 53 is a pilot valve having a spool valve 54 therein. The spool valve 54 is normally urged by a spring 54' to the right position as indicated, keeping the top chamber of actuator 49 continuously closed to a hole 65. However, when the pressure fluid is supplied to the right side of the pilot valve 53, the spool valve 54 moves to the left against the force of the spring 54'. Thus, the top chamber of actuator 49 is opened to the discharge hole 55.

Reference numeral 59 is an arm shift actuator for moving the loading arm 2 in an axial direction of the swing shaft. When a piston 62 in the actuator 59 is at right as indicated, the pin 2' (FIG. 7) projecting on the forward side surface of the loading arm 2 is in the center hole of the work $a$. When the piston 62 is shifted to the left, the pin 2' is disengaged from the center hole of the workpiece $a$.

Reference numeral 60 is an arm shift actuator for moving the unloading arm 4 in the axial direction of the swing shaft. When a piston 63 in the actuator 60 is at the right as indicated, the pin 8' projecting at the forward end of the rod member 8 of the unloading arm 4 is in the center hole of the workpiece $a'$. When the piston 63 is moved to left, the pin 8' on the rod member 8 of the unloading arm 4 is disengaged with the center hole of the workpiece $a'$.

Reference numeral 61 is a swing actuator for the work divider $b$. This actuator includes a piston 64 slidably mounted therein.

Next, description is made for the function of the embodiment illustrated in FIG. 10.

First, at the initial state of the loading arm 2 and the unloading arm 4 the solenoid $Sb$ of a changeover valve V is energized according to the signal that the retraction of the wheel slide has been accomplished after completion of the machining operation on the workpiece $a$. Next, the changeover valve V is shifted to the left, thereby making the position II continuous with pressure source P. Thereupon, the pressure fluid from the supply source P is supplied to a bottom chamber of the actuator 49 through a port at the bottom thereof, a bottom chamber of the actuator 50 through a port at the bottom thereof and to the right side of the pilot valve 53.

As the result, the spool valve 54 is moved to the left position; the fluid discharged out of the top chamber of the actuator 49 now flows via the discharge hole 55 of the pilot valve 53 to the changeover valve V and thereafter is discharged to a reservoir. As a result, the piston 51 begins to move upward, thereby turning the swing shaft 13 through the engagement between the rack 19' and the pinion 20' and swinging the unloading arm 4 counterclockwise toward the discharge channel 5.

However, the fluid at the top chamber of the actuator 50 is prevented by the check valve 57 of the mechanical changeover valve 56 from being discharged, so that the piston 52 cannot move upward and accordingly the loading arm 2 remains at rest and does not yet start turning.

When the unloading arm 4 is moved counterclockwise by a predetermined amount, the cam 69 on the swing shaft 13 contacts and pushes up the spool 58 of the check valve 56, thereby forcibly opening the nonreturn check valve 57. As the result of this action the fluid at the top chamber of the actuator 50 is discharged through the mechanical changeover valve 56 to the reservoir. Thus, the piston 52 begins to move upward, thereby the swing shaft 27 is turned via the rack 19'' and the pinion 20'' to turn the loading arm 2 clockwise to approach the machining position.

In the embodiment shown in FIG. 10, the dog 69 is so arranged on the swing shaft 13 that when the unloading arm 4 has arrived at an almost midpoint between the machining position and the discharge position, it will open the check valve 57 to initiate the swinging of the loading arm 2, thereby permitting large diameter workpieces to be loaded and unloaded without mutual interference. Thereby, it is desirable to so adjust the cam 69 for appropriately setting the acting time of the loading arm 2 so as not to allow the workpieces to interfere with each other.

Thus, in the first instance the piston 51 reaches the top end to swing the unloading arm 4 up to the discharge channel 5. Thereafter, when the piston 52 is shifted to the top end to bring the loading arm 2 to the machining position, the workpiece $a$ supported by the loading arm 2 is moved onto the work supports 3, 3' and attached to the headstock by means of the magnetic chuck 31.

When the piston 52 reaches the top end, the dog 70 which turns together with the swing shaft 27 actuates the limit switch $LS_2$. Upon the confirmation instruction from this limit switch $LS_2$, the grinding wheel slide is then moved toward the workpiece $a$ to start the machining operation thereon.

When the piston 52 reaches the top end of its cylinder resulting in the start of the machining operation, simultaneously therewith the communication passage 40' is opened into the bottom chamber of the cylinder 50 and thereby permitting the pressure fluid which has been supplied to the bottom chamber of the cylinder 50 to flow via the communication passage 40' of the valve rod 41' to the right sides of actuator 59, 60, 61, to move the respective pistons 62, 63 and 64 to the left.

As the result of leftward displacement of the pistons 62, 63, the pins 2', 8' respectively projecting at the tip ends of the loading arm 2 and the unloading arm 4 are disengaged with their respective center holes of the workpieces $a$, $a'$. The finished workpiece $a'$ is released onto the discharge channel 5, while the unfinished workpiece is left on the work supports 3, 3'. Meanwhile the leftward displacement of the piston 64 causes the feed work divider $b$ to turn clockwise and the work supply hooks 35, 35' to assume the position indicated by the dotted lines in FIG. 7, thereby holding a single workpiece $a$ to be machined next.

The fluid in the actuators 59, 60, 61 is discharged through the discharge hole 55 of the pilot valve 53, and the changeover valve V to the reservoir.

When the pistons 62, 63 of actuators 59, 60 reach the left extreme position the limit switches $LS_3$ and $LS_4$ are actuated or pushed to generate signals for energizing the solenoid $Sa$, instead of the solenoid $Sb$, whereby the changeover valve V is switched from the position II to the position I. Thereupon, the pressure fluid which has flowed into the right side of the pilot valve 53 is interrupted and the spring force returns the spool valve 54 to assume the right-hand position indicated in FIG. 10.

The pressure fluid from the supply source P pushes against the check valve 57 of the mechanical switch valve 56 to open it and through the check valve 57 the pressure fluid flows into the top chamber of the cylinder 50, thereby moving the piston 52 downward.

Downward movement of the piston 52 causes the swing shaft 27 to turn counterclockwise via the rack 19″ and the pinion 20″ and the loading arm 2 to swing from the machining position toward the loading position adjacent to the right end of the feed channel I.

When the piston 52 reaches the bottom and the loading arm 2 reaches the loading position, the pressure fluid which has been supplied to the top chamber of the cylinder 50 now flows via the communication hole 40 of the valve rod 41 and the hole 65 of the pilot valve 53 into the top chamber of the actuator 49, thereby moving the piston 51 downward.

Downward movement of the piston 51 causes the swing shaft 13 to turn clockwise via the rack 19′ and the pinion 20′ and the unloading arm 4 to swing toward the machining position.

When the piston 51 reaches the bottom and the unloading arm 4 reaches the machining position, the pressure fluid which has been supplied to the top chamber of actuator 49 is now supplied via the communication hole 40b of the valve rod 41b to the left sides of actuators 59, 60, thereby moving the pistons 62, 63 to the right. As the result, the pin 2″ projecting at the end of the loading arm 2 is engaged with the center hole of the work a to be machined next, which workpiece is held by the hooks 35, 35′ on the feed work divider b, and the pin 8′ projecting from the rod member 8 of the unloading arm 4 is engaged with the center hole of the workpiece a′ being machined on the work supports 3, 3′.

When the piston 63 reaches the end of its rightward stroke, the intermediate hole 66 is opened and thus, the pressure fluid supplied to the left side of the piston 63 is permitted to flow via the hole 66 into the left side of the swing actuator 61, thereby moving the piston 64 to the right.

When the piston 64 moves to the right, the feed work divider b turns counterclockwise and the work supply hooks 35, 35′ assume the position indicated by a solid line in FIG. 7, placing the workpiece a to be machined next in a condition ready to be moved out by the loading arm 2 to the machining position. And this condition is maintained until the preceding workpiece is completely ground.

Upon completion of the grinding on the workpiece a′ a signal is issued to retract the wheel slide. When a complete retraction of the slide is confirmed, a signal is issued to deenergize the solenoid Sa and to energize the solenoid Sb, thereby restoring the apparatus to its initial state to again repeat the same process.

In FIG. 10, 67 is a manually-operated check valve, which is used in sucking the pressure fluid from the discharge tank into the hydraulic actuator when the piston of each actuator is operated manually, at this time the spool 58 is held at a position to open the check valve 57 by the manual switch lever 68.

Further in FIG. 10, there are provided two actuators for axially shifting the loading arm and the unloading arm, that is, for moving the pins projecting from the arm ends back and forth individually. This is for the purpose of making the axial movement smoother, whereas in the preceding embodiment, one actuator suffices to perform the same function with the aid of a connecting rod.

As described above, in this invention a piston or pistons are reciprocated by the action of pressure fluid to cause the loading arm and the unloading arm to swing. There are provided valve rods which are slidably engaged within a bore in the piston and open or close communication passages depending on the movement of the piston. And in this mechanism there are means to supply a workpiece to the loading arm and a mechanism to cause axial movements of the loading arm and the unloading arm both of which are timed by cooperation of the piston and the valve rods. Therefore, when the loading arm and the unloading arm swing to a predetermined position, they are engaged or disengaged with the workpieces. Thus, the number of changeover valves and relay coils can be decreased to make the apparatus relatively free from poor operation or failures.

Since in another embodiment according to the invention, the loading arm and the unloading arm of this invention are separately operated by respective actuators, the timings of the swinging of the loading arm and the unloading arm can be staggered so that when larger diameter workpieces are required to be machined, the unfinished workpiece and the finished workpiece will not interfere with each other during the operation.

Moreover, according to this invention the unloading arm is built in the form of two pivoted rod members that can be extended or collapsed. And without causing mutual interference between unfinished workpiece and finished workpiece, the swinging angle of the loading and unloading arms can be made relatively small to thus reduce the cycle time and improve the overall efficiency of the machining operation.

What I claim is:

1. Automatic loading and unloading device for a grinding machine comprising a housing, a feed channel mounted on said housing for supplying unfinished workpieces, a discharge channel mounted on said housing for discharging finished workpieces, loading means capable of carrying an unfinished workpiece one after another from a loading position at said feed channel to a grinding position at work supporting means, unloading means capable of carrying a finished workpiece one after another from said grinding position to a discharge position at said discharge channel, drive means for moving said loading means between said loading position and said grinding position and for moving said unloading means between said grinding position and said discharge position, and shift means for shifting said loading and unloading means to engage the workpieces at said loading position and said grinding position respectively and to disengage the workpieces at said grinding position and said unloading position respectively, said unloading means comprising first and second rod members, a link member and a stop member, said first rod member being connected to said drive means at one end thereof and at the other end thereof, pivotably connected to one end of said second rod member which is engageable with the finished workpiece, said link member being engaged with said second rod member to control a travel path of said second rod member, said stop member being engageable with one of said first and second rod members to position said unloading means at said grinding position precisely.

2. Automatic loading and unloading device for a grinding machine as claimed in claim 1, wherein said link member is pivotably connected to said second rod member at one end thereof and provided with a hole at the other end thereof through which hole an engaging pin fixedly mounted on said housing is arranged with a clearance to allow relative motion by a predetermined extent between said engaging pin and said link member.

3. Automatic loading and unloading device for a grinding machine as claimed in claim 1, wherein said drive means comprises a first hydraulic actuator for moving said loading means and said unloading means, linking means operably connecting first and second shafts with each other which are fixedly connected to said loading and unloading means respectively, said linking means being slidable in axial direction and retained from rotation with respect to said first and second shafts, and a connecting rod connected to said linking means at one end thereof and to a disc with an eccentricity at the other end thereof to thereby turn said loading and unloading means simultaneously when said disc is rotated by said first hydraulic actuator, said shift means comprises a second hydraulic actuator for moving said first and second shafts in their axial direction.

4. Automatic loading and unloading device for a grinding machine as claimed in claim 3, wherein said first hydraulic actuator comprises a housing having a chamber therein, a piston slidably mounted in said chamber and having a through hole therein, a pair of valve rods screwed to said housing and slidably engaged with said through hole at opposite sides of said piston, said valve rods being provided with respective communication holes therein, whereby said piston is displaced by a predetermined extent in one direction to thereby open one end of one of said communication holes to said chamber, pressure fluid in said chamber is introduced to said second hydraulic actuator through said communication hole to shift said loading and unloading means.

5. Automatic loading and unloading device for a grinding machine as claimed in claim 1, which further comprises divider means adapted to prevent the drop of unfinished workpieces from said feed channel and to allow said loading means to carry the unfinished workpieces from said loading position to said grinding position.

6. Automatic loading and unloading device for a grinding machine as claimed in claim 5, wherein said drive means comprises a first hydraulic actuator for moving said loading means and said unloading means, linking means operably connecting first and second shafts with each other which are fixedly connected to said loading and unloading means respectively, and a connecting rod connected to said linking means at one end thereof and to a disc at other end thereof which is rotated by means of said first hydraulic actuator, said shift means comprises a second hydraulic actuator for moving said first and second shafts in their axial direction said divider means comprises a rotatable disc having hooks on a surface thereof and a third hydraulic actuator for turning said rotatable disc.

7. Automatic loading and unloading device for a grinding machine as claimed in claim 6, wherein said first hydraulic actuator comprises a housing having a chamber therein, a piston slidably mounted in said chamber and having a through hole therein, a pair of valve rods screwed to said housing and slidably engaged with said through hole at opposite sides of said piston, said valve rods being provided with respective communication holes therein, said second hydraulic actuator is provided with three ports for pressure fluid, whereby when said piston is displaced by a predetermined extent in one direction for moving said loading means from said loading position to said grinding position and for moving said unloading means from said grinding position to said unloading position to thereby open one end of one of said communication holes to said chamber, pressure fluid in said chamber is introduced to said second and third hydraulic actuators through said communication hole to shift said loading and unloading means to disengage from the unfinished workpiece and the finished workpiece respectively and to turn said rotatable disc in one direction to prevent the drop of the unfinished workpieces from said feed channel, and when said piston is displaced by a predetermined extent in another direction for moving said loading means from said grinding position to said loading position and for moving said unloading means from said unloading position to said grinding position to thereby open one end of the other of said communication holes to said chamber, pressure fluid in said chamber is introduced to said second hydraulic actuator through last mentioned communication hole to shift said loading and unloading means to engage the unfinished and finished workpieces respectively, and when said loading and unloading means engaged with said workpieces, one middle port of said three ports is opened to direct pressure fluid flown into said second hydraulic actuator through last mentioned communication hole to said third hydraulic actuator to turn said rotatable disc in another direction.

8. Automatic loading and unloading device for a grinding machine as claimed in claim 1, wherein said drive means comprises a first hydraulic actuator operably connected to said loading means, a second hydraulic actuator operably connected to said unloading means, pilot valve means associated with said first and second hydraulic actuators for controlling flow of pressure fluid from said second hydraulic actuator and to said first hydraulic actuator, and mechanical valve means actuated by a cam means which is operably connected to said second hydraulic actuator, said mechanical valve means controlling flow of pressure fluid to and from said first hydraulic actuator, said shift means comprises a first shift hydraulic actuator for shifting said loading means in one direction to engage the unfinished workpiece and in another direction to disengage therefrom, and a second shift hydraulic actuator for shifting said unloading means in one direction to engage the finished workpiece and in another direction to disengage therefrom, said first and second shift actuators being actuated simultaneously in one direction by pressure fluid through one of said first and second hydraulic actuators and in another direction by pressure fluid through the other thereof.

9. Automatic loading and unloading device for a grinding machine as claimed in claim 8, which further comprises divider means comprising a rotatable disc having hooks on a surface thereof and a third hydraulic actuator for turning said rotatable disc in one direction to prevent the drop of unfinished workpieces from said feed channel and in another direction to allow said loading means to carry the unfinished workpieces from said loading position to said grinding position.

10. Automatic loading and unloading device for a grinding machine as claimed in claim 8, wherein said first hydraulic actuator comprises a housing having a chamber therein, a first piston slidably mounted in said chamber and having a through hole therein, a pair of valve rods screwed to said housing and slidably engaged with said through hole at opposite sides of said piston, said valve rods being provided with respective communication holes therein, whereby, when said piston is displaced by a predetermined extent in one direction to thereby open one end of one of said communication holes to said chamber, pressure fluid in said chamber is introduced to said first and second shift actuators through said communication hole to shift said loading and unloading means in one direction and when said piston is displaced by a predetermined extent in another direction to thereby open one end of the other of said communication holes to said chamber, pressure fluid in said chamber is introduced to said second hydraulic actuator through last mentioned communication hole.

11. Automatic loading and unloading device for a grinding machine as claimed in claim 8, wherein said second hydraulic actuator comprises a housing having a chamber therein, a second piston slidably mounted in said second chamber and a through hole therein, a valve rod screwed to said housing and slidably engaged with said through hole at one side of said piston, said valve rod being provided with communication hole therein, whereby when said piston is displaced by a predetermined extent in a direction to open one end of said communication hole to said second chamber, pressure fluid in said second chamber is introduced to said first and second shift actuators through said communication hole to shift said loading and unloading means to engage the unfinished workpiece and the finished workpiece respectively.